UNITED STATES PATENT OFFICE.

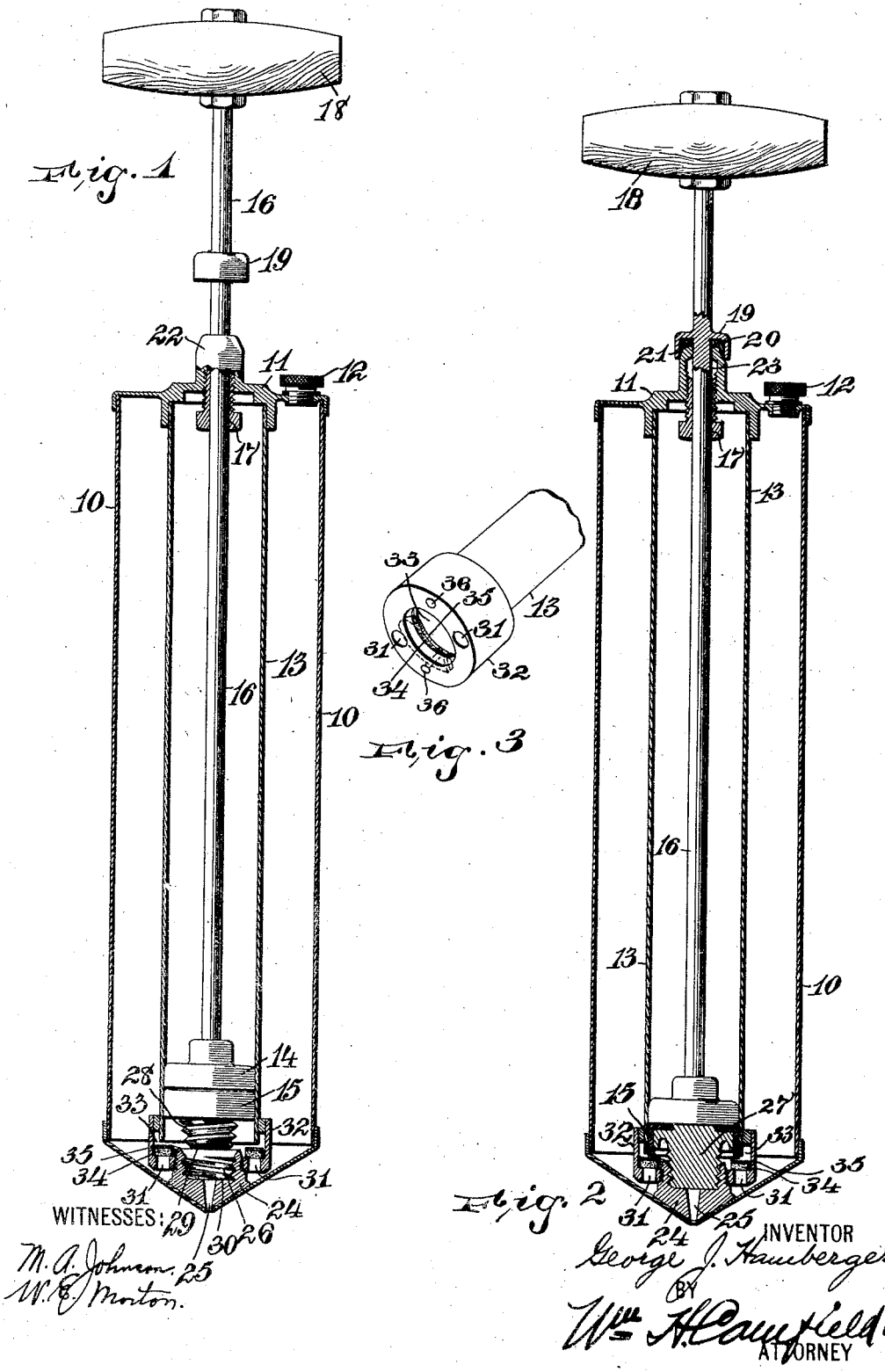

GEORGE J. HAMBERGER, OF NEWARK, NEW JERSEY.

FIRE-EXTINGUISHER.

1,039,933.

Specification of Letters Patent. Patented Oct. 1, 1912.

Application filed July 25, 1911. Serial No. 640,488.

*To all whom it may concern:*

Be it known that I, GEORGE J. HAMBERGER, a citizen of the United States, residing at Newark, in the county of Essex and State of New Jersey, have invented certain new and useful Improvements in Fire-Extinguishers; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a fire-extinguisher which is adapted to hold a liquid extinguishing material and is constructed so that the bottom and top of the extinguisher can be sealed to prevent the evaporation of the liquid within.

The extinguisher is constructed to cause the ejection of the liquid when desired, the ejecting or expelling means being quickly operative when the sealing devices are released, the sealing devices being operated by the same handle as the expelling means.

The invention further consists of certain details of construction and arrangements of parts that go to make a more efficient device, these being brought out more fully in the following specification and also embodied in the claims.

The invention is illustrated in the accompanying drawing, in which—

Figure 1 is a vertical section of the extinguisher ready for use. Fig. 2 is a similar view with the extinguisher closed and sealed. Fig. 3 is a perspective view of the bottom end of a cylinder used in the extinguisher.

The extinguisher consists of a casing 10 which is preferably made of sheet metal, the casing having a top 11 which is provided with a filling plug 12 to permit the pouring in of the extinguishing liquid. Within the casing 10 is a cylinder 13 in which slides the piston 14 of any usual construction and having, preferably, a leather or similar flexible bucket 15 therein. The piston-rod 16 is attached to the piston 14 and extends through the opening 17 in the top of the casing. A handle 18 is at the end of the rod 16 to provide for its manipulation. The piston-rod 16 has a collar 19 which acts as a backing for a washer 20, the collar being preferably provided with a marginal flange 21. The top of the casing has a nose 22 against which the washer 20 is brought when the piston is about at the end of its forward stroke. The stuffing-box 23 can be placed within the nose, if desired.

The casing is provided with a block 24 which has an outlet opening 25 therein, as has also the casing. The block has a screw-thread 26 and the piston has a lug 27 having screw-threads 28 which engage the screw-threads 26 of the block 24 when the piston-rod is rotated. The flat face 29 of the lug forms a valve which is seated on the flat bottom 30 of the interiorly screw-threaded portion 26, which forms a valve-seat, when the piston is rotated by means of its rod, and the outlet of the extinguisher is sealed. The screw-threaded co-acting elements 27 and 24 are preferably provided with tapered screw-threaded portions, as shown in the drawings, so that they can be quickly joined and also quickly separated.

When the lug 27 is screwed down in the block 24 it draws down the piston-rod 16 and compresses the washer 20 against the nose 22 and thus seals the opening through which the piston-rod slides to prevent leakage or evaporation at that point.

It will be evident that the reciprocation of the piston-rod and its piston will empty the cylinder at one complete forward stroke. At the back stroke the piston draws liquid from outside the cylinder 13 and within the casing 10, through the holes 31 in the bottom of the collar 32, which collar is fastened to the block 24 and is also attached to the cylinder 13, and being larger than the block or cylinder, forms a chamber 33. The flaps 34, which may have the springs 35 and which are fastened by rivets 36, act as checks or valves over the openings 31.

When an extinguisher is filled and laid away or hung up for use, the handle of the piston-rod is rotated and the outlet and also the opening through which the piston-rod projects are sealed to prevent leakage and evaporation of the contents of the extinguisher. When the extinguisher is needed, the handle is unscrewed, about one rotation being necessary when tapered threads are used, and the piston can then be reciprocated to expel the contents of the extinguisher. The threads are usually made with a coarse pitch so that unnecessary rotation to bring about sealing is avoided.

It will of course be understood that I do not wish to limit myself to the exact construction shown, since minor details of construction can be changed without departing from the scope of my invention.

Having thus described my invention, what I claim is:—

1. A fire-extinguisher consisting of a casing, a cylinder within the casing, a rotary and reciprocating piston in the cylinder having a rod projecting from one end of the casing, the casing having an outlet on the end opposite the projected piston-rod, a block forming a valve-seat, the block having an internal screw-threaded portion and having an opening in line with the outlet of the casing, and a screw-threaded lug on the piston adapted to engage the screw-threaded portion of the block, the lug having a flat face to engage the seat portion of the block acting to seal the outlet when the piston is rotated at the end of its power stroke.

2. A fire-extinguisher consisting of a casing, a cylinder within the casing, a rotary and reciprocating piston in the cylinder having a rod projecting from one end of the casing, the casing having an outlet on the end opposite the projected piston-rod, a block forming a valve-seat, the block having an internal tapered screw-threaded portion and having an opening in line with the outlet of the casing, a tapered screw-threaded lug on the piston adapted to engage the screw-threaded portion of the block, the lug having a flat face to engage the seat portion of the block and acting to seal the outlet when the piston is rotated at the end of its power stroke, a collar engaging the block and the cylinder to form a chamber at the bottom of the cylinder, perforations in the bottom of the collar, and inwardly opening flap-valves over the openings in the collar to permit the flow of fluid from the casing to the cylinder.

In testimony, that I claim the foregoing, I have hereunto set my hand this 20th day of July 1911.

GEORGE J. HAMBERGER.

Witnesses:
WM. H. CAMFIELD,
M. A. JOHNSON.

Copies of this patent may be obtained for five cents each, by addressing the "Commissioner of Patents, Washington, D. C."